(12) United States Patent
Koyanagi et al.

(10) Patent No.: US 11,310,384 B2
(45) Date of Patent: Apr. 19, 2022

(54) IMAGE PROCESSING APPARATUS, IMAGE PROCESSING SYSTEM, AND NON-TRANSITORY COMPUTER READABLE MEDIUM STORING PROGRAM

(71) Applicant: FUJIFILM Business Innovation Corp., Tokyo (JP)

(72) Inventors: Takeyasu Koyanagi, Kanagawa (JP); Atsuhiro Itoh, Kanagawa (JP); Jun Kimura, Kanagawa (JP); Yuki Iguchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 324 days.

(21) Appl. No.: 16/182,624

(22) Filed: Nov. 7, 2018

(65) Prior Publication Data
US 2019/0158681 A1     May 23, 2019

(30) Foreign Application Priority Data
Nov. 17, 2017     (JP) .............................. JP2017-221483

(51) Int. Cl.
*H04N 1/00* (2006.01)
*H04N 1/32* (2006.01)

(52) U.S. Cl.
CPC ....... *H04N 1/0083* (2013.01); *H04N 1/00832* (2013.01)

(58) Field of Classification Search
None
See application file for complete search history.

(56) References Cited

U.S. PATENT DOCUMENTS

| | | | |
|---|---|---|---|
| 4,581,656 A * | 4/1986 | Wada ................. | H04N 1/32363 358/437 |
| 5,535,015 A * | 7/1996 | Yoshida ............. | H04N 1/32101 358/405 |

(Continued)

FOREIGN PATENT DOCUMENTS

| | | | |
|---|---|---|---|
| JP | H07288641 | 10/1995 | |
| JP | 2001223838 | * 8/2001 | ............... H04N 1/00 |

(Continued)

OTHER PUBLICATIONS

Office Action of Japan Counterpart Application, with English translation thereof, dated Jun. 22, 2021, pp. 1-6.

(Continued)

*Primary Examiner* — Beniyam Menberu
(74) *Attorney, Agent, or Firm* — JCIPRNET

(57) ABSTRACT

An image processing apparatus includes a document reading section, a reading controller, an image transfer section, and a transfer controller. The document reading section reads documents. The reading controller controls the document reading section so as to read document images subsequent to a first sheet independently of a command from a host apparatus. The image transfer section transfers the document images which are read by the document reading section. The transfer controller controls the image transfer section based on the number of pages of the documents, which are read by the document reading section, and the number of pages of the document images, which are transferred by the image transfer section, in a case where the document images are transferred by the image transfer section whenever the document reading section reads one sheet of document.

16 Claims, 6 Drawing Sheets

(56) References Cited

U.S. PATENT DOCUMENTS

| | | | |
|---|---|---|---|
| 6,862,114 B1* | 3/2005 | Hayashi | H04N 1/32609 |
| | | | 358/1.15 |
| 8,305,657 B2 | 11/2012 | Shimizu et al. | |
| 8,630,029 B2 | 1/2014 | Shimizu et al. | |
| 9,854,105 B1* | 12/2017 | Krishnasamy | H04N 1/04 |
| 2006/0253505 A1* | 11/2006 | Natsume | G06F 16/93 |
| 2007/0263262 A1* | 11/2007 | Hayashi | H04N 1/00222 |
| | | | 358/474 |
| 2009/0216888 A1* | 8/2009 | Furukawa | H04L 67/06 |
| | | | 709/228 |
| 2009/0310194 A1* | 12/2009 | Shimizu | H04N 1/00962 |
| | | | 358/498 |
| 2015/0055177 A1* | 2/2015 | Saito | G06F 3/1206 |
| | | | 358/1.15 |
| 2016/0027004 A1* | 1/2016 | Suzuki | H04L 63/0435 |
| | | | 705/64 |

FOREIGN PATENT DOCUMENTS

| | | |
|---|---|---|
| JP | 2009303093 | 12/2009 |
| JP | 2016025488 | 2/2016 |

OTHER PUBLICATIONS

"Office Action of Japan Counterpart Application" with English translation thereof, dated Jan. 11, 2022, p. 1-p. 3.

* cited by examiner

IMAGE PROCESSING APPARATUS, IMAGE PROCESSING SYSTEM, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2017-221483 filed Nov. 17, 2017.

BACKGROUND

Technical Field

The present invention relates to an image processing apparatus, an image processing system, and a non-transitory computer readable medium storing a program.

SUMMARY

According to an aspect of the invention, there is provided an image processing apparatus including: a document reading section that reads documents; a reading controller controls the document reading section so as to read document images subsequent to a first sheet independently of a command from a host apparatus; an image transfer section that transfers the document images, which are read by the document reading section; and a transfer controller that controls the image transfer section based on the number of pages of the documents, which are read by the document reading section, and the number of pages of the document images, which are transferred by the image transfer section, in a case where the document images are transferred by the image transfer section whenever the document reading section reads one sheet of document.

BRIEF DESCRIPTION OF THE DRAWINGS

Exemplary embodiment(s) of the present invention will be described in detail based on the following figures, wherein.

DETAILED DESCRIPTION

Subsequently, an exemplary embodiment of the present invention will be described in detail with reference to the accompanying drawings.

Figure 1:
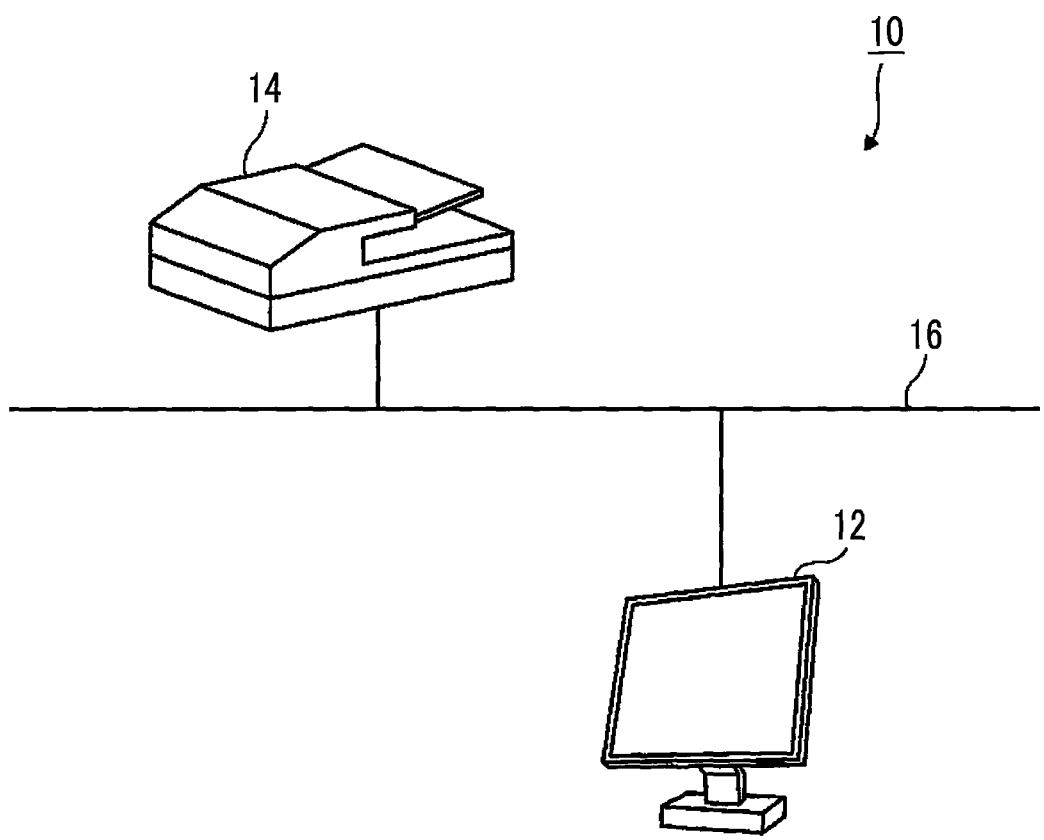
FIG. 1 is a configuration diagram illustrating an image processing system according to an exemplary embodiment of the present invention.

FIG. 1 illustrates an image processing system 10 according to the exemplary embodiment of the present invention.

In the image processing system 10, a host apparatus 12 and an image processing apparatus 14 are connected to each other via a network 16. The host apparatus 12 is, for example, a personal computer, and the image processing apparatus 14 is, for example, an image reading apparatus.

Figure 2:
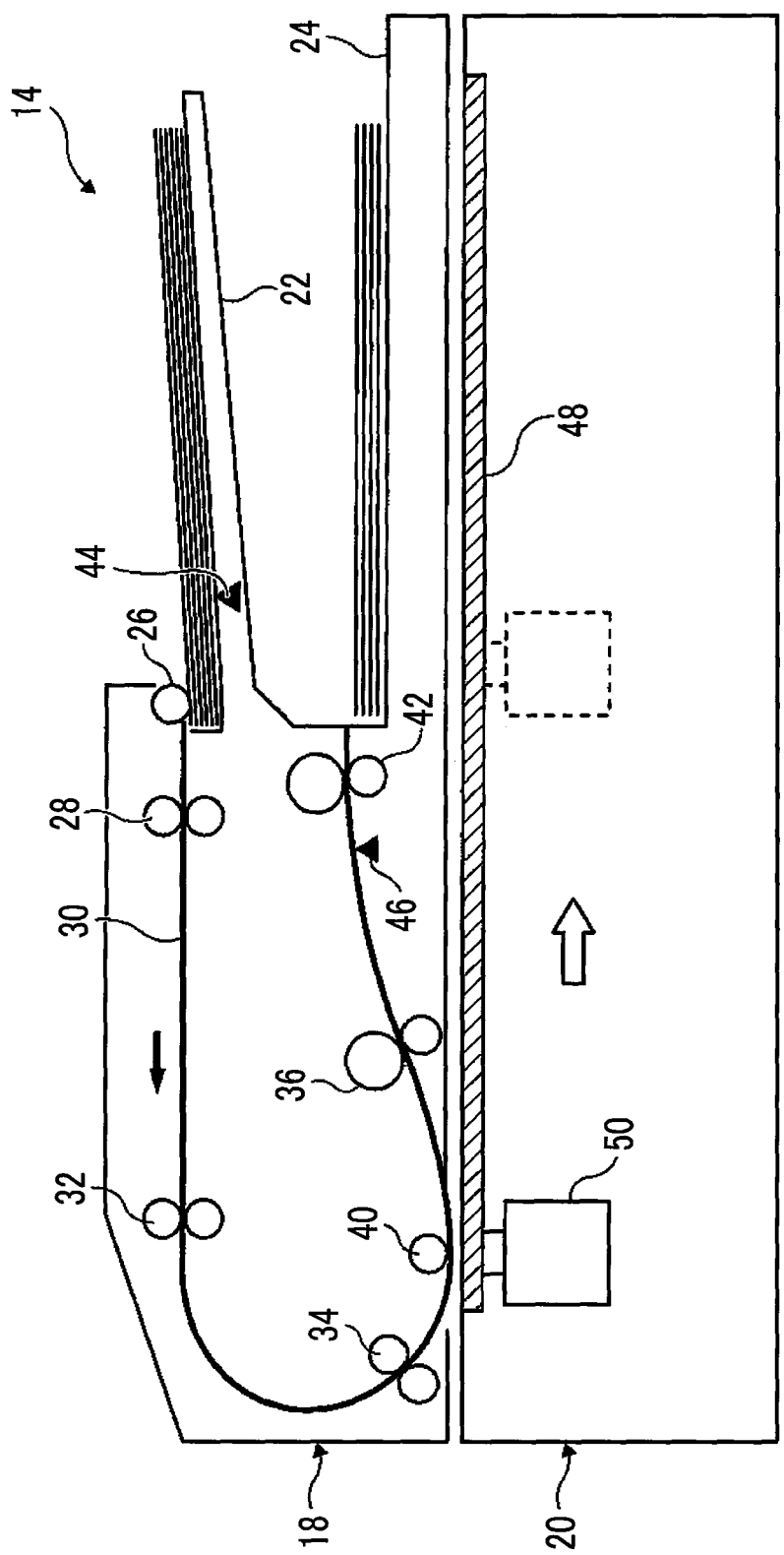
FIG. 2 is a sectional diagram illustrating an image processing apparatus according to the exemplary embodiment of the present invention.

As illustrated in FIG. 2, the image processing apparatus 14 includes an automatic document sending device 18, and a reading device 20 which reads a document that is sent by the automatic document sending device 18.

The automatic document sending device 18 includes a recording medium storage unit 22 which loads a bundle of recording media including plural recording media, and an ejected paper storage unit 24 which is provided below the recording medium storage unit 22 and which loads a completely read recording medium. In addition, the automatic document sending device 18 includes an extraction roller 26 which extracts and conveys the recording medium in the recording medium storage unit 22. Furthermore, a manipulation machine 28, which manipulates the recording medium one by one, is provided on a downstream side of the extraction roller 26 in a recording medium conveyance direction. Conveyance rollers 32 to 36, a platen roller 40, and a discharge roller 42 are sequentially provided from an upstream side in the recording medium conveyance direction on a conveyance path 30 through which the recording medium is conveyed. The platen roller 40 presses the recording medium, which is being read by the reading device 20, from above. The discharge roller 42 conveys the read recording medium, and furthermore, discharges the recording medium to the ejected paper storage unit 24.

A first sensor 44 is provided in the recording medium storage unit 22, and detects whether or not the recording medium exists in the recording medium storage unit 22. The first sensor 44 may be a mechanical type in which an actuator is driven in a case where the recording medium exists in the recording medium storage unit 22, and may be an optical type in which a light emitting element and a light receiving element are provided and in which detection is performed according to whether or not light is blocked.

A second sensor 46 is provided on an upstream side of the ejected paper storage unit 24, and detects whether or not the recording medium is ejected. The second sensor 46 may be a mechanical type in which the actuator is driven in a case where the recording medium passes through the second sensor 46, and may be an optical type in which the light emitting element and the light receiving element are provided and in which the passage of the recording medium is detected according to whether or not light is blocked.

In addition, a sheet of platen glass 48 is provided on an upper surface of the reading device 20. An image reading unit 50 is disposed below the platen glass 48. The image reading unit 50 is configured to stop below the platen roller 40 and to read a document, which is sent by the automatic document sending device 18 (automatic document sending mode), or is configured to move along the platen glass 48 and to read a document which is placed on the platen glass 48 (platen mode).

Figure 3:
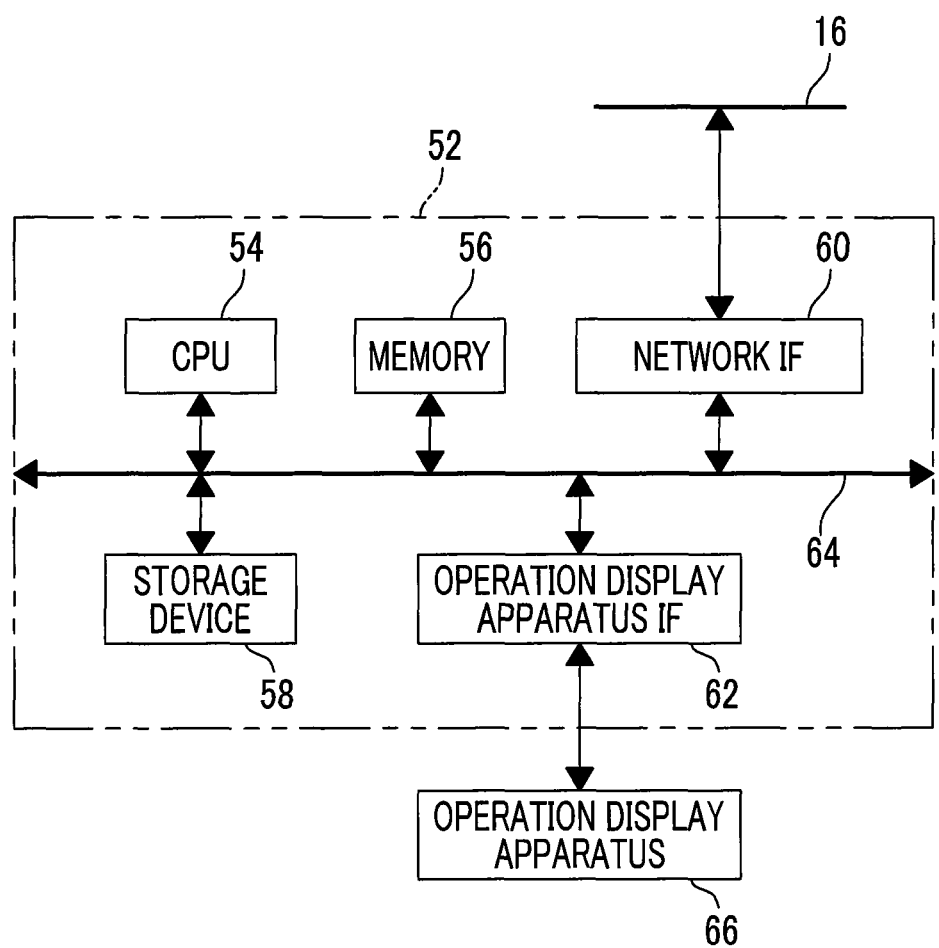
FIG. 3 is a block diagram illustrating a control unit of a host apparatus used in the exemplary embodiment of the present invention.

FIG. 3 illustrates a hardware configuration of a control unit 52 in the host apparatus 12.

The control unit 52 includes a CPU 54, a memory 56, a storage device 58, a network interface 60, and an operation display apparatus interface 62. The CPU 54, the memory 56, the storage device 58, the network interface 60, and the operation display apparatus interface 62 are connected through a control bus 64.

The CPU 54 performs a predetermined process based on a control program stored in the memory 56. The network interface 60 is connected to the above-described network 16.

The storage device 58 includes, for example, a hard disk or the like. A scan driver corresponding to the TWAIN standard and application software (for example, Docuworks, Docuworks is a registered trademark of Fuji Xerox Co., Ltd) corresponding to the TWAIN standard are installed and stored in the storage device 58.

Meanwhile, here, a TWAIN standard is one of standards which determine technical specifications used to fetch image data from application software, which is being executed on a computer, by controlling an input device such as an image scanner. The TWAIN standard is developed by a TWAIN working group and is an abbreviation of Technology Without An Interesting Name. In a case where both driver software and the application software (image editing software or the like) of the image scanner are in conformity with the TWAIN standard, an image is fetched by calling the scanner, which is connected to the computer, from the application software, and thus it is possible to immediately start editing. In addition, a scan driver is a program used to control a scanner device.

Meanwhile, the application software is a generic term for software used to perform a specific work. In a case where the application software is operated on operating software, it is possible to perform a work according to a purpose.

An operation display apparatus 66 is connected to the operation display apparatus interface 62. The operation display apparatus 66 is configured such that, for example, a touch panel is combined with a liquid crystal panel, an operation instruction is provided through a displayed operation unit, or an operation result is displayed.

Figure 4:
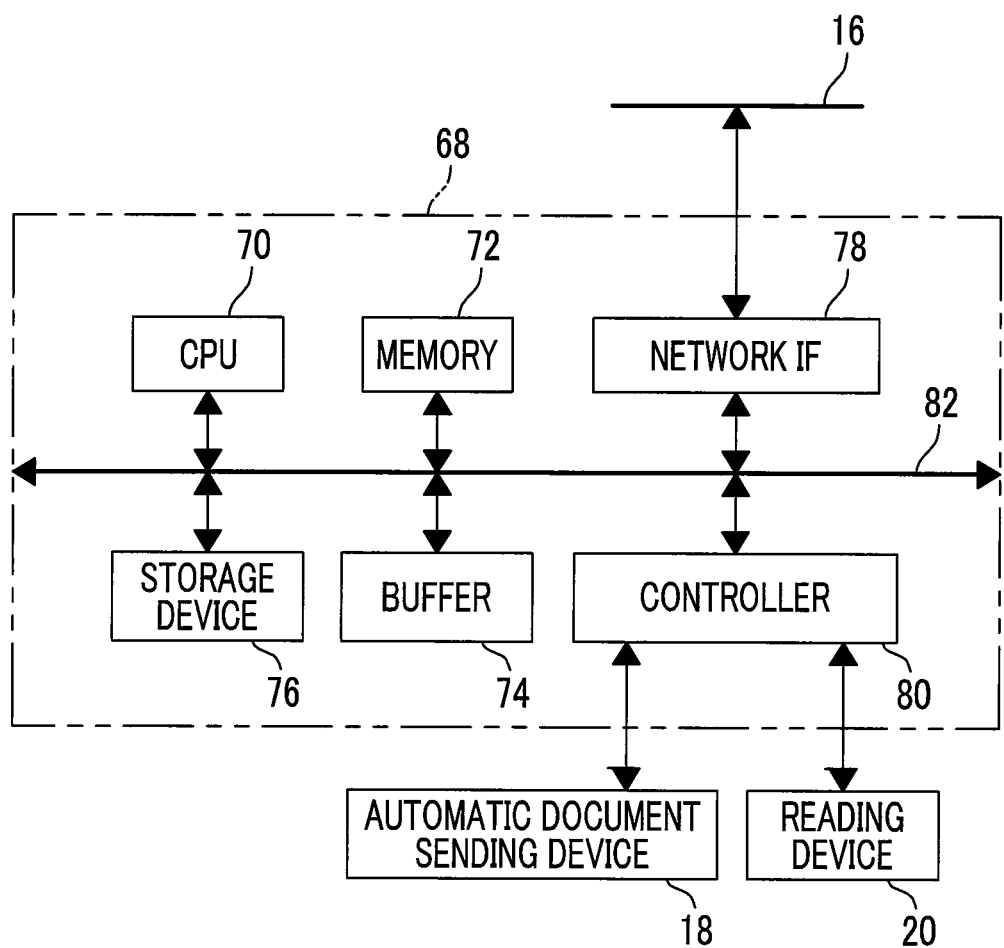
FIG. 4 is a block diagram illustrating a control unit of the image processing apparatus according to the exemplary embodiment of the present invention.

FIG. 4 illustrates a hardware configuration of a control unit 68 in the image processing apparatus 14.

The control unit 68 includes a CPU 70, a memory 72, a buffer 74, a storage device 76, a network interface 78, and a controller 80. The CPU 70, the memory 72, the buffer 74, the storage device 76, the network interface 78, and the controller 80 are connected to each other through a control bus 82.

The CPU 70 performs a predetermined process based on a control program stored in the memory 72. The network interface 78 is connected to the above-described network 16. The buffer 74 temporarily stores a read document image.

The controller 80 is connected to the above-described automatic document sending device 18 and the reading device 20, and controls the automatic document sending device 18 and the reading device 20.

Figure 5:
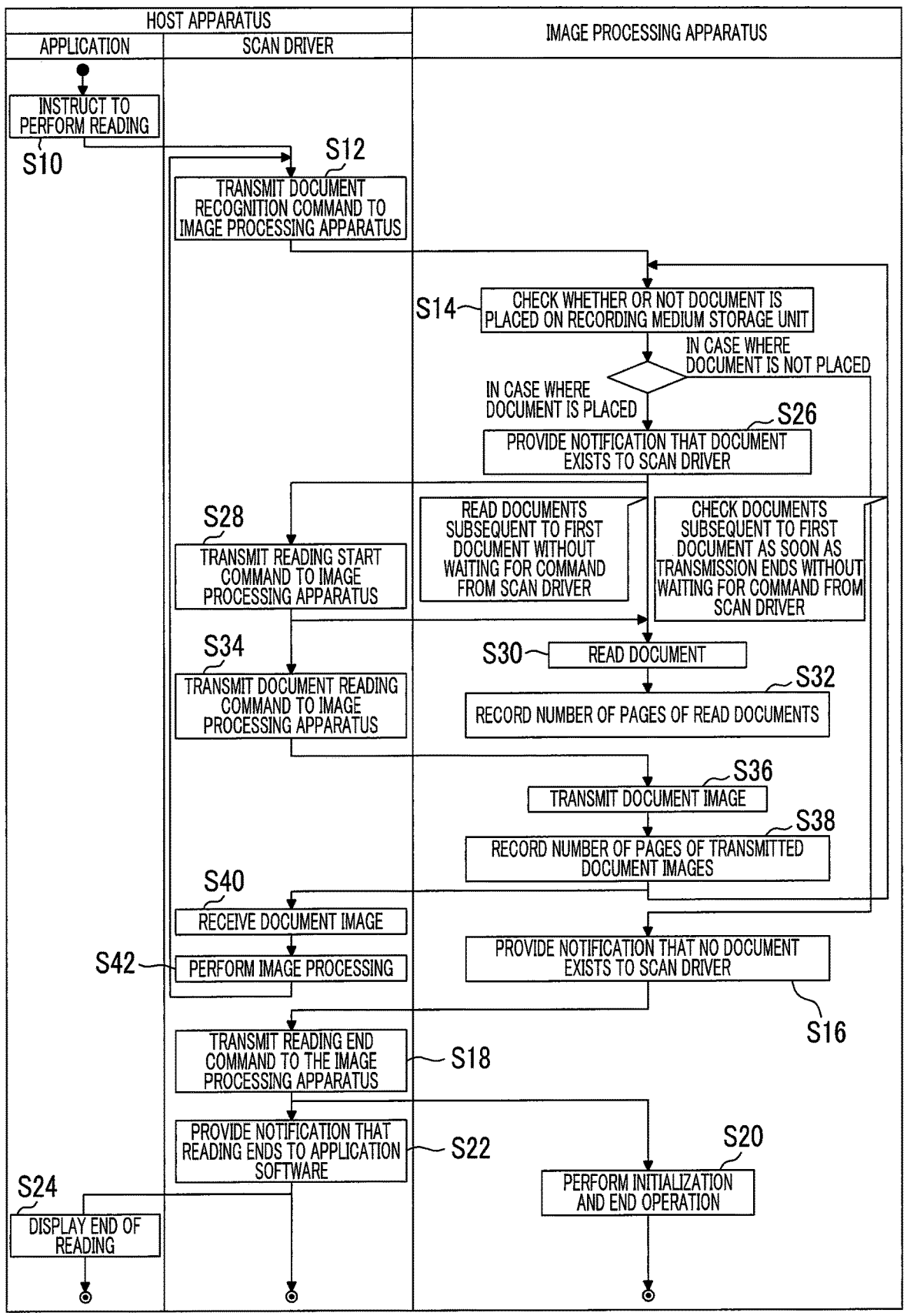
FIG. 5 is a sequence diagram illustrating a processing flow of the image processing system in the exemplary embodiment of the present invention.

FIG. 5 is a sequence diagram illustrating a processing flow in the image processing system 10.

Here, cases where the application software in conformity with the above-described TWAIN standard is driven, the automatic document sending mode is selected, and all the documents placed on the recording medium storage unit 22 are transferred will be described.

In addition, the application software of the host apparatus 12 provides a reading instruction to the scan driver in step S10. In a case where the reading instruction is received from the application software in the scan driver, the process proceeds to step S12, and a document recognition command is transmitted to the image processing apparatus 14.

In a case where the document recognition command is received from the scan driver in the image processing apparatus 14, the process proceeds to step S14, and it is checked whether or not a document is placed on the recording medium storage unit 22. The check is performed based on an output of the first sensor 44.

In a case where it is determined that no document is placed on the recording medium storage unit 22 in step S14, the process proceeds to step S16, and a notification that no document is placed is provided to the scan driver. In the scan driver which receives the notification that no document is placed, the process proceeds to step S18, and a reading end command is transmitted to the image processing apparatus 14. In the image processing apparatus 14 in which the reading end command is received, the process proceeds to step S20, and initialization is performed and the operation ends. In addition, in subsequent step S22 performed in the scan driver, a notification that the reading ends is provided to the application software. In a case where the notification that the reading ends is received in the application software, the end of reading is displayed on the above-described operation display apparatus 66 in step S24, and the process ends.

In contrast, in a case where it is determined that the document is placed on the recording medium storage unit 22 in step S14, the process proceeds to step S26, and a notification that the document exists is provided to the scan driver. In the scan driver which receives the notification that the document exists, the process proceeds to step S28 and a reading start command is transmitted to the image processing apparatus 14.

In a case where the reading start command is received from the scan driver in the image processing apparatus 14, the document is read in step S30. After the document is read in step S30, the process proceeds to subsequent step S32, and the number of pages of the read documents is recorded. Meanwhile, whether or not the document is read is determined based on the output of the second sensor 46.

In a case where the process in step S28 ends in the scan driver, the process proceeds to subsequent step S34, and a document reading command is transmitted to the image processing apparatus 14. In a case where the document reading command is received from the scan driver in the image processing apparatus 14, the process proceeds to step S36, and the document image, which is read in step S36, is transferred to the scan driver. In a case where the document image is transferred in step S36, the process proceeds to subsequent step S38, and the number of pages of the transferred document images is recorded.

In contrast, in a case where the document image is received from the image processing apparatus 14 in step S40 in the scan driver, the process proceeds to subsequent step S42. In step S42, image processing is performed on the received document image. Here, the image processing includes image modification and conversion, noise removal, contrast enhancement, and the like.

In a case where the image processing ends in step S42, the process returns to step S12.

The flow until now is a process performed on a document corresponding to a first page.

Subsequently, a flow of reading documents subsequent to the first page will be described.

As described above, it is checked whether or not a document is placed on the recording medium storage unit 22 in step S14. However, here, determination as below is performed.

(1) A document is placed on the recording medium storage unit 22. → A document is placed.

(2) No document is placed on the recording medium storage unit 22. Besides, the number of pages of the read documents, which is recorded in step S32, is equal to the number of pages of the transferred document images, which is recorded in step S38. → No document is placed.

(3) No document is placed on the recording medium storage unit 22. Besides, the number of pages of the read documents, which is recorded in step S32, is larger than the number of pages of the transferred document images, which is recorded in step S38. → The document is placed.

Similar to the document corresponding to the first page, an initial value of the number of pages of the read documents and an initial value of the number of pages of the transferred document images are 0. Therefore, actually, determination is performed based on whether or not a document is placed on the recording medium storage unit 22.

As above, a reason that the number of pages of the read documents is compared with the number of pages of the transferred document images is that it is necessary to control the transfer because the documents subsequent to the first page are read independently of the command of the scan driver, as will be described later.

In a case where it is determined that the document is placed in step S14, the process proceeds to step S26, and a notification that the document exists is provided to the scan driver. In the scan driver, the reading start command is transmitted to the image processing apparatus 14 in step S28. However, in the image processing apparatus 14, the process proceeds from step S26 to step S30 independently of the reading start command in step S28. Therefore, in the image processing apparatus 14, a subsequent document is read independently of the command provided from the scan driver, and the document is temporarily stored in the buffer 74. In subsequent step S32, the number of pages of the read documents is recorded.

Meanwhile, in a case where a capacity of the buffer 74 is not sufficient, the reading of the document temporarily stops, the document images are transferred in step S36, and a waiting state is continued until an idle capacity is generated in the buffer 74.

In contrast, in a case where the process in step S28 ends in the scan driver, the process proceeds to step SS34, and the document reading command is transmitted to the image processing apparatus 14. In the image processing apparatus 14 which receives the document reading command, the process proceeds to step S36, the document images are transferred, and the number of pages of the document images, which are transferred in subsequent step S38, is recorded.

In a case of the document corresponding to a first sheet, the process proceeds to step S40 and step S42 in the print driver after the number of pages of the document images, which are transferred in step S38, is recorded. However, in a case of a document corresponding to a second sheet, the process returns to step S14 in a case where the process in step S38 ends. Therefore, a subsequent document is read in a case where the document is placed without performing the image processing in step S42 which requires time. Therefore, time, which is required for the image processing to be performed, is reduced.

In the TWAIN standard, the image processing in step S42 is performed whenever one sheet of document is read, the process returns to step S12 after the image processing in step S42 ends, and the document recognition command is transmitted. In contrast, in the exemplary embodiment, the document subsequent to the first document is read without waiting for the document recognition command from the scan driver. Therefore, in a case where the document recognition command is transmitted in step S12, the document is already read antecedently, and thus a situation in which no document remains in the recording medium storage unit 22 is generated. In a case where it is determined that no document remains in step S14 as it is in such a situation, the process proceeds to step S16, a notification that no document exists is provided to the scan driver, the reading end command is issued to the image processing apparatus 14 in step S18 in the scan driver, the process ends in the image processing apparatus 14, and thus the operation in the image processing apparatus 14 ends regardless of the remaining document image in the buffer.

Here, in the exemplary embodiment, in step S14, it is assumed that the "document is placed" until the number of sheets of the read documents coincides with the number of pages of the transferred document images even though actually no document exists as shown in (2) and (3), and thus it is possible to transmit all the document images which remain in the buffer.

Figure 6:
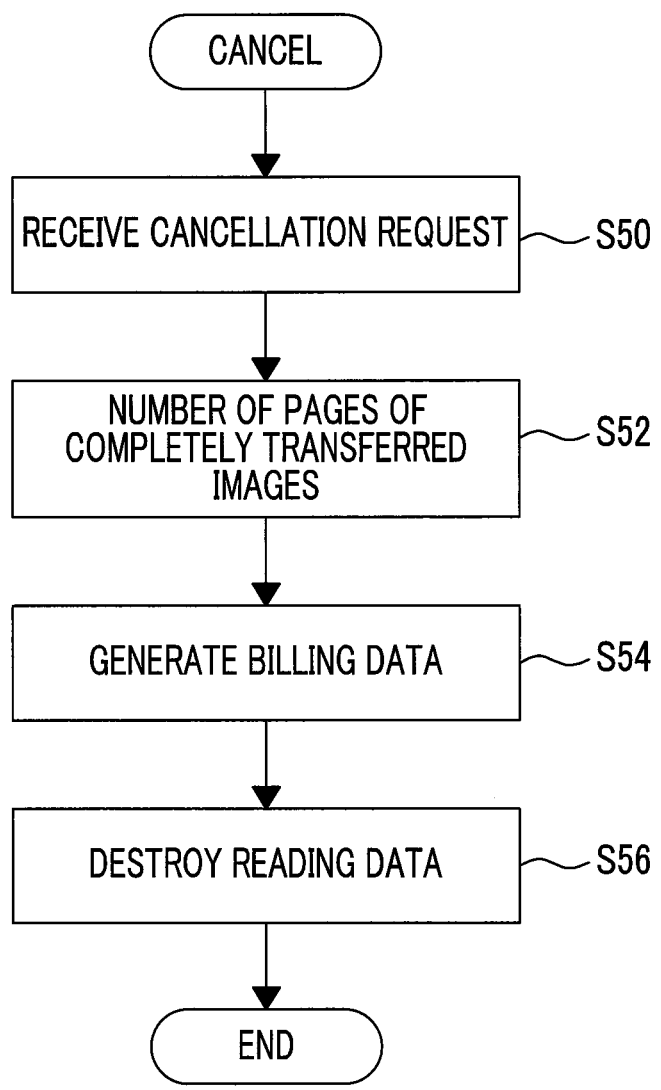
FIG. 6 is a flowchart illustrating a processing flow in a case where cancellation is generated in the exemplary embodiment of the present invention.

FIG. 6 is a flowchart illustrating a flow in a case where the host apparatus 12 requests to perform cancellation at the image processing apparatus 14.

Meanwhile, the cancellation refers to stop an action which is reserved once, and, here, refers to request to stop an action before the whole document is transferred.

First, in step S50, a request for the cancellation is received from the host apparatus 12. In subsequent step S52, the number of pages of the completely transferred document images, which is recorded in above-described step S38, is read.

In subsequent step S54, billing data is generated based on the number of pages of the completely transferred document images, which is read in step S52. That is, billing is performed with respect to the transferred document images, and billing using the number of sheets of the documents, which are read in the image processing apparatus 14, is not performed.

Furthermore, in subsequent step S56, reading data is destroyed and the process ends.

Meanwhile, in the exemplary embodiment, an image reading-dedicated scanner is provided as an example of the image processing apparatus. The exemplary embodiment is not limited thereto and, for example, a device, in which copying and printing are possible in addition to image reading, may be used. In addition, although a personal computer is provided as an example of the host apparatus, a device, such as a smart phone, may be included in the host apparatus.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a sensor configured to read documents;
a reading controller configured to control the sensor so as to read document images subsequent to a first sheet independently of a command from a host computer;
a network interface configured to transfer the document images, which are read by the sensor; and a transfer controller configured to control the network interface based on the number of pages of the documents, which are read by the sensor, and the number of pages of the document images, which are transferred by the network interface, in a case where the document images are transferred by the network interface whenever the sensor reads one sheet of document, wherein the document images, which are read, subsequent to the first sheet, by the sensor, are not directly transferred by the network interface to the host computer and being transferred after the command from the host computer is transmitted, wherein the transfer controller ends the transfer of the images performed by the network interface in a case where no document to be read exists and the number of pages of the document images, which are read by the sensor, coincides with the number of pages of the images which are transferred by the network interface.

2. The image processing apparatus according to claim 1, wherein the transfer controller continues the transfer of the images performed by the network interface in a case where the number of pages of the document images, which are read by the sensor, is larger than the number of pages of the images which are transferred by the network interface.

3. The image processing apparatus according to claim 2, wherein the transfer controller stops the transfer of the images performed by the network interface in a case where a stop command is received even though the number of pages of the document images, which are read by the sensor, is larger than the number of pages of the images which are transferred by the network interface.

4. The image processing apparatus according to claim 3, wherein the transfer controller
records the number of pages of the documents, which are read by the sensor,
records the number of pages of the images which are transferred by the network interface, and
compares the number of pages of the documents, which has been recorded, with the number of pages of the images, which has been recorded.

5. The image processing apparatus according to claim 4, further comprising:
an automatic document sending device, comprising a plurality of roller, configured to convey a plurality of the documents,
wherein the sensor reads the documents which are sent by the automatic document sending device.

6. The image processing apparatus according to claim 3, further comprising:
an automatic document sending device, comprising a plurality of roller, configured to convey a plurality of the documents,
wherein the sensor reads the documents which are sent by the automatic document sending device.

7. The image processing apparatus according to claim 2, wherein the transfer controller
records the number of pages of the documents, which are read by the sensor,
records the number of pages of the images which are transferred by the network interface, and
compares the number of pages of the documents, which has been recorded, with the number of pages of the images, which has been recorded.

8. The image processing apparatus according to claim 7, further comprising:
an automatic document sending device, comprising a plurality of roller, configured to convey a plurality of the documents,
wherein the sensor reads the documents which are sent by the automatic document sending device.

9. The image processing apparatus according to claim 2, further comprising:
an automatic document sending device, comprising a plurality of roller, configured to convey a plurality of the documents,
wherein the sensor reads the documents which are sent by the automatic document sending device.

10. The image processing apparatus according to claim 1, wherein the transfer controller
records the number of pages of the documents, which are read by the sensor,
records the number of pages of the images which are transferred by the network interface, and
compares the number of pages of the documents, which has been recorded, with the number of pages of the images, which has been recorded.

11. The image processing apparatus according to claim 10, further comprising:
an automatic document sending device, comprising a plurality of roller, configured to convey a plurality of the documents,
wherein the sensor reads the documents which are sent by the automatic document sending device.

12. The image processing apparatus according to claim 1, further comprising:
an automatic document sending device, comprising a plurality of roller, configured to convey a plurality of the documents,
wherein the sensor reads the documents which are sent by the automatic document sending device.

13. An image processing system comprising:
an image processing apparatus configured to transmit a read document image; and
a host computer configured to receive the image which is transmitted from the image processing apparatus,
wherein the image processing apparatus includes
a sensor configured to read the document image,
a reading controller configured to control the sensor so as to read document images subsequent to a first sheet independently of a command transmitted from the host computer,
a network interface configured to transfer the document images, which are read by the sensor, to the host computer, and
a transfer controller configured to control the network interface based on the number of pages of the documents, which are read by the sensor, and the number of pages of the document images, which are transferred to the host computer by the network interface, in a case where the document images are transferred by the network interface whenever the sensor reads one sheet of document,
wherein the document images, which are read, subsequent to the first sheet, by the sensor, are not directly transferred by the network interface to the host computer and being transferred after the command from the host computer is transmitted,
wherein the transfer controller ends the transfer of the images performed by the network interface in a case where no document to be read exists and the number of pages of the document images, which are read by the sensor, coincides with the number of pages of the images which are transferred by the network interface.

14. The image processing system according to claim 13, wherein a scan driver in conformity with a TWAIN standard is installed in the host computer, and
wherein the image processing apparatus is operated by the scan driver of the host computer.

15. The image processing system according to claim 14, wherein application software in conformity with the TWAIN standard is installed in the host computer.

16. A non-transitory computer readable medium storing a program causing a computer to execute a process, the process comprising:
reading documents;
controlling so as to read document images subsequent to a first sheet independently of a command from a host computer;
transferring the read images; and
controlling the transfer based on the number of pages of the read documents and the number of pages of the transferred document images in a case where the document images are transferred whenever one sheet of document is read,
wherein the document images, which are read, subsequent to the first sheet, are not directly transferred to the host computer and being transferred after the command from the host computer is transmitted,
wherein the transfer controller ends the transfer of the images performed by the network interface in a case where no document to be read exists and the number of pages of the document images, which are read by the sensor, coincides with the number of pages of the images which are transferred by the network interface.

* * * * *